US012170097B2

(12) United States Patent
Sommerfeldt et al.

(10) Patent No.: US 12,170,097 B2
(45) Date of Patent: Dec. 17, 2024

(54) DETECTION OF AUDIO COMMUNICATION SIGNALS PRESENT IN A HIGH NOISE ENVIRONMENT

(71) Applicants: Caterpillar Inc., Deerfield, IL (US); Brigham Young University, Provo, UT (US)

(72) Inventors: Scott Sommerfeldt, Mapleton, UT (US); Curtis Lynn Garner, Provo, UT (US); Jonathan Daren Blotter, Heber City, UT (US); David Charles Copley, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 295 days.

(21) Appl. No.: 17/889,871

(22) Filed: Aug. 17, 2022

(65) Prior Publication Data

US 2024/0062774 A1 Feb. 22, 2024

(51) Int. Cl.
G10L 25/84 (2013.01)
G10L 21/0216 (2013.01)
(52) U.S. Cl.
CPC .......... *G10L 25/84* (2013.01); *G10L 21/0216* (2013.01); *G10L 2021/02166* (2013.01)
(58) Field of Classification Search
CPC ................. G10L 25/84; G10L 21/0216; G10L 2021/02166; G10L 2021/02165;
(Continued)

(56) References Cited

U.S. PATENT DOCUMENTS 8,315,407 B2 * 11/2012 Jeon ........................ H04S 1/007
367/118
8,606,571 B1 12/2013 Every et al.
(Continued)

FOREIGN PATENT DOCUMENTS

CN 112363112 A 2/2021
CN 113345433 9/2021
(Continued)

OTHER PUBLICATIONS

Byoungho Kwon et al: "Sound source localization for robot auditory system using the summed GCC method", Control, Automation and Systems, 2008. ICCAS 2008. International Conference On, IEEE, Piscataway, NJ, USA, Oct. 14, 2008 (Oct. 14, 2008), pp. 241-245, XP031367944, ISBN: 978-89-950038-9-3.
(Continued)

*Primary Examiner* — Thuykhanh Le

(57) ABSTRACT

A system comprises error microphones disposed in a predetermined pattern to capture audio signals including speech and one or more reference sensors to capture a reference noise signal from a noise source. A portion of the reference noise signal is removed from the captured audio signals to generate partially processed audio signals, which are paired to form signal pairs. For each signal pair, a modified cross-correlation vector, with effects of low frequency contents removed, is generated, then converted to a rotated angular domain cross-correlation vector based in part on a physical angle associated with locations of an associated pair of error microphones. The rotated angular domain cross-correlation vectors are summed, and a weighting vector is applied to the sum to identify direction information of (Continued)

a desired audio signal associated with the speech. The directional information is utilized to beamform the partially processed audio signals and output the desired audio signal.

20 Claims, 11 Drawing Sheets

(58) Field of Classification Search
  CPC ..... G10L 25/06; H04R 1/406; H04R 2410/05; H04R 3/005; G01S 3/8083; G01S 3/8086
  USPC ........................................................ 704/233
  See application file for complete search history.

(56) References Cited

U.S. PATENT DOCUMENTS

| | | | |
|---|---|---|---|
| 9,800,983 B2 | 10/2017 | Wacquant et al. | |
| 10,755,727 B1* | 8/2020 | Chu | G10L 25/78 |
| 11,107,492 B1* | 8/2021 | Chu | H04R 3/005 |
| 11,749,294 B2* | 9/2023 | Chu | H04R 1/406 |
| | | | 704/233 |
| 11,915,698 B1* | 2/2024 | Lee | G10L 15/08 |
| 12,046,229 B2* | 7/2024 | Gupta | H04M 1/72433 |
| 2004/0240680 A1* | 12/2004 | Rui | G10L 21/0272 |
| | | | 381/56 |
| 2010/0303254 A1* | 12/2010 | Yoshizawa | G01S 3/8083 |
| | | | 381/92 |
| 2012/0128174 A1* | 5/2012 | Tammi | H04S 1/002 |
| | | | 381/98 |
| 2013/0202116 A1* | 8/2013 | Par | H04S 5/00 |
| | | | 381/17 |
| 2015/0071446 A1* | 3/2015 | Sun | H04S 5/00 |
| | | | 381/17 |
| 2015/0080729 A1* | 3/2015 | Miyachi | A61B 8/0891 |
| | | | 600/443 |
| 2016/0133272 A1 | 5/2016 | Sherwood et al. | |
| 2016/0171965 A1* | 6/2016 | Arai | G01S 5/22 |
| | | | 381/56 |
| 2017/0140771 A1* | 5/2017 | Taniguchi | G10L 15/05 |
| 2018/0188104 A1* | 7/2018 | Arai | G01M 3/24 |
| 2020/0070816 A1* | 3/2020 | O'Donnell | H04R 1/326 |
| 2020/0070862 A1* | 3/2020 | Bilodeau | G01H 3/10 |
| 2020/0163038 A1* | 5/2020 | Li | H04L 27/2666 |
| 2020/0213728 A1* | 7/2020 | Lopatka | G01S 3/8083 |
| 2021/0390952 A1 | 12/2021 | Masnadi-Shirazi et al. | |
| 2022/0124597 A1* | 4/2022 | Yang | H04W 48/18 |
| 2022/0171947 A1* | 6/2022 | Xu | G06N 20/00 |
| 2022/0301575 A1* | 9/2022 | Yasuda | G10L 25/18 |
| 2022/0342026 A1* | 10/2022 | Arai | G01S 3/8083 |
| 2022/0377483 A1* | 11/2022 | Taherian | H04S 7/302 |
| 2022/0412835 A1* | 12/2022 | Sewell | G01S 3/801 |
| 2023/0086579 A1* | 3/2023 | Kim | G10L 25/51 |
| | | | 704/246 |
| 2023/0090916 A1* | 3/2023 | Yang | H04N 21/4223 |
| | | | 348/169 |
| 2023/0164475 A1* | 5/2023 | Chen | H04R 1/1041 |
| | | | 381/74 |
| 2023/0206928 A1* | 6/2023 | Yeung | G10L 17/02 |
| | | | 704/246 |
| 2023/0224636 A1* | 7/2023 | Veselinovic | H04R 1/326 |
| | | | 381/58 |
| 2023/0245638 A1* | 8/2023 | Veselinovic | G10K 11/17881 |
| | | | 381/66 |
| 2023/0247350 A1* | 8/2023 | Donjon | G01S 3/8083 |
| | | | 381/92 |
| 2023/0283949 A1* | 9/2023 | Radisavljevic | H04S 7/302 |
| | | | 381/92 |
| 2023/0296723 A1* | 9/2023 | Wu | H04R 23/008 |
| | | | 367/117 |
| 2023/0334646 A1* | 10/2023 | Ziola | G01M 3/24 |
| 2024/0046955 A1* | 2/2024 | Xu | G10L 21/0208 |
| 2024/0064449 A1* | 2/2024 | Tao | H04R 1/08 |
| 2024/0105198 A1* | 3/2024 | Yang | G10L 15/26 |
| 2024/0118363 A1* | 4/2024 | Yasuda | G10K 11/1752 |
| 2024/0137702 A1* | 4/2024 | Thumerel | G01S 3/8083 |
| 2024/0155290 A1* | 5/2024 | Hiroe | G10L 21/0308 |
| 2024/0155303 A1* | 5/2024 | Visser | H04R 5/027 |

FOREIGN PATENT DOCUMENTS

| | | |
|---|---|---|
| WO | WO2021216414 | 10/2021 |
| WO | 2023118382 A1 | 6/2023 |

OTHER PUBLICATIONS

European Extended Search Report for Europe Patent Appln. No. 23188897.5, mailed Dec. 20, 2023 (10 pgs).

* cited by examiner

DETECTION OF AUDIO COMMUNICATION SIGNALS PRESENT IN A HIGH NOISE ENVIRONMENT

TECHNICAL FIELD

The present disclosure relates to a system and method for extracting audio communication signals, such as a speech, present in a high noise environment, and more particularly, to a system and method for correlating spatially separated audio signals and applying a weighting vector to the correlated audio signal to extract desired audio communication signals.

BACKGROUND

Machines may be used to perform variety of tasks at a worksite. For example, machines may be used to excavate, move, shape, contour, and/or remove material present at the worksite, such as gravel, concrete, asphalt, soil, and/or other materials. Many machine tasks require an operator of the machine to hear instructions from someone nearby, such as a spotter or others outside the machine. Without a radio, such as a walkie-talkie, it can be difficult for the operator to hear instructions from the spotter due to the noise of the machine.

U.S. Patent Publication No. 2021/0390952A1 ("the '952 publication"), published Dec. 16, 2021, describes systems and methods including a plurality of audio input components for generating a plurality of audio input signals and a logic device for receiving the plurality of audio input signals. The systems and methods determine whether the plurality of audio signals comprise target audio associated with an audio source, estimate a relative location of the audio source with respect to the plurality of audio input components based on the plurality of audio signals and a determination of whether the plurality of audio signals comprise the target audio, and process the plurality of audio signals to generate an audio output signal by enhancing the target audio based on the estimated relative location. Specifically, the '952 publication describes estimating a location of a target speaker by applying a modified Time Difference of Arrival (TDOA) or Direction of Arrival (DOA) of one or more concurrent speakers when a stronger dominant noise/interference source is consistently present and utilizing the target speaker's unique spatial fingerprint or Relative Transfer Function (RTF), which is estimated by effectively nulling the dominant noise source.

Although the '952 publication describes the target audio and noise reaching the microphones of the audio processing device from different directions, and processing the audio input signals to enhance the target audio and suppress noise based on the estimated location, the microphones described in the '952 publication are stationary, and the system described in the '952 publication is only configured to identify noise from the same microphones receiving the target audio. As a result, the microphones in the system set forth in the '952 publication cannot detect a primary noise separately from the target audio. Additionally, because the system set forth in the '952 publication is set up for an omnidirectional use, even if the likely direction of the target audio were known, it is unable to take advantage of the target audio direction knowledge.

The systems and methods described herein are directed to addressing one or more of the drawbacks set forth above.

SUMMARY

According to a first aspect, a system comprises a plurality of error microphones disposed in a predetermined pattern, each of which is operational to capture a respective audio signal including speech and to generate a respective captured audio signal; one or more reference sensors operational to capture a reference noise signal from a noise source; a processor communicatively coupled to the plurality of error microphones and the one or more reference sensors; and memory communicatively coupled to the processor, the memory storing computer-executable instructions that, when executed by the processor, cause the processor to perform operations. The operations comprise generating a plurality of partially processed audio signals by removing at least a portion of the reference noise signal from each captured audio signal; generating a plurality of signal pairs by pairing partially processed audio signals; for each signal pair of the plurality of signal pairs, generating a respective rotated angular domain cross-correlation vector based, at least in part, on a physical angle associated with locations of a pair of error microphones associated with the signal pair; generating a summed angular domain cross-correlation vector by summing the rotated angular domain cross-correlation vectors; generating a weighted angular domain vector by applying a weighting vector to the summed angular domain cross-correlation vector; and identifying directional information of a desired audio signal associated with the speech from the weighted angular domain vector.

According to another aspect, a method comprises capturing a respective audio signal including a speech by each error microphone of a plurality of error microphones disposed in a predetermined pattern; capturing a reference noise signal from a noise source by one or more reference sensors; generating a plurality of partially processed audio signals by removing at least a portion of the reference noise signal from each captured audio signal; generating a plurality of signal pairs by pairing partially processed audio signals; for each signal pair of the plurality of signal pairs, generating a respective rotated angular domain cross-correlation vector based, at least in part, on a physical angle associated with locations of a pair of error microphones associated with the signal pair; generating a summed angular domain cross-correlation vector by summing the rotated angular domain cross-correlation vectors; generating a weighted angular domain vector by applying a weighting vector to the summed angular domain cross-correlation vector; and identifying directional information of a desired audio signal associated with the speech from the weighted angular domain vector.

According to yet another aspect, a machine comprises a frame supporting an engine; a cab supported by the frame and including an operator compartment, the operator compartment including one or more speakers configured to emit sound; a work tool supported by the frame; a plurality of error microphones disposed in a predetermined pattern on exterior of the machine, each error microphone of the plurality of error microphones operational to capture a respective audio signal including a speech, and generate a respective captured audio signal; one or more reference sensors operational to capture a reference noise signal from the engine; a processor operably connected to the plurality of error microphones and the one or more reference sensors; and memory communicatively coupled to the processor, the memory storing computer-executable instructions that, when executed by the processor, cause the processor to perform operations. The operations comprise generating a plurality of partially processed audio signals by removing at least a portion of the reference noise signal from each captured audio signal; generating a plurality of signal pairs by pairing partially processed audio signals; for each signal pair of the plurality of signal pairs, generating a respective rotated angular domain cross-correlation vector based, at least in part, on a physical angle associated with locations of a pair of error microphones associated with the signal pair; generating a summed angular domain cross-correlation vector by summing the rotated angular domain cross-correlation vectors; generating a weighted angular domain vector by applying a weighting vector to the summed angular domain cross-correlation vector; identifying directional information of a desired audio signal associated with the speech from the weighted angular domain vector; beamforming the plurality of partially processed audio signals based on the directional information and outputting the desired audio signal associated with the speech; and reproducing the desired audio signal associated with the speech via the one or more speakers.

BRIEF DESCRIPTION OF THE DRAWINGS

The detailed description is described with reference to the accompanying figures. In the figures, the left-most digit of a reference number identifies the figure in which the reference number first appears. The same reference numbers in different figures indicate similar or identical items.

DETAILED DESCRIPTION

Figure 1:
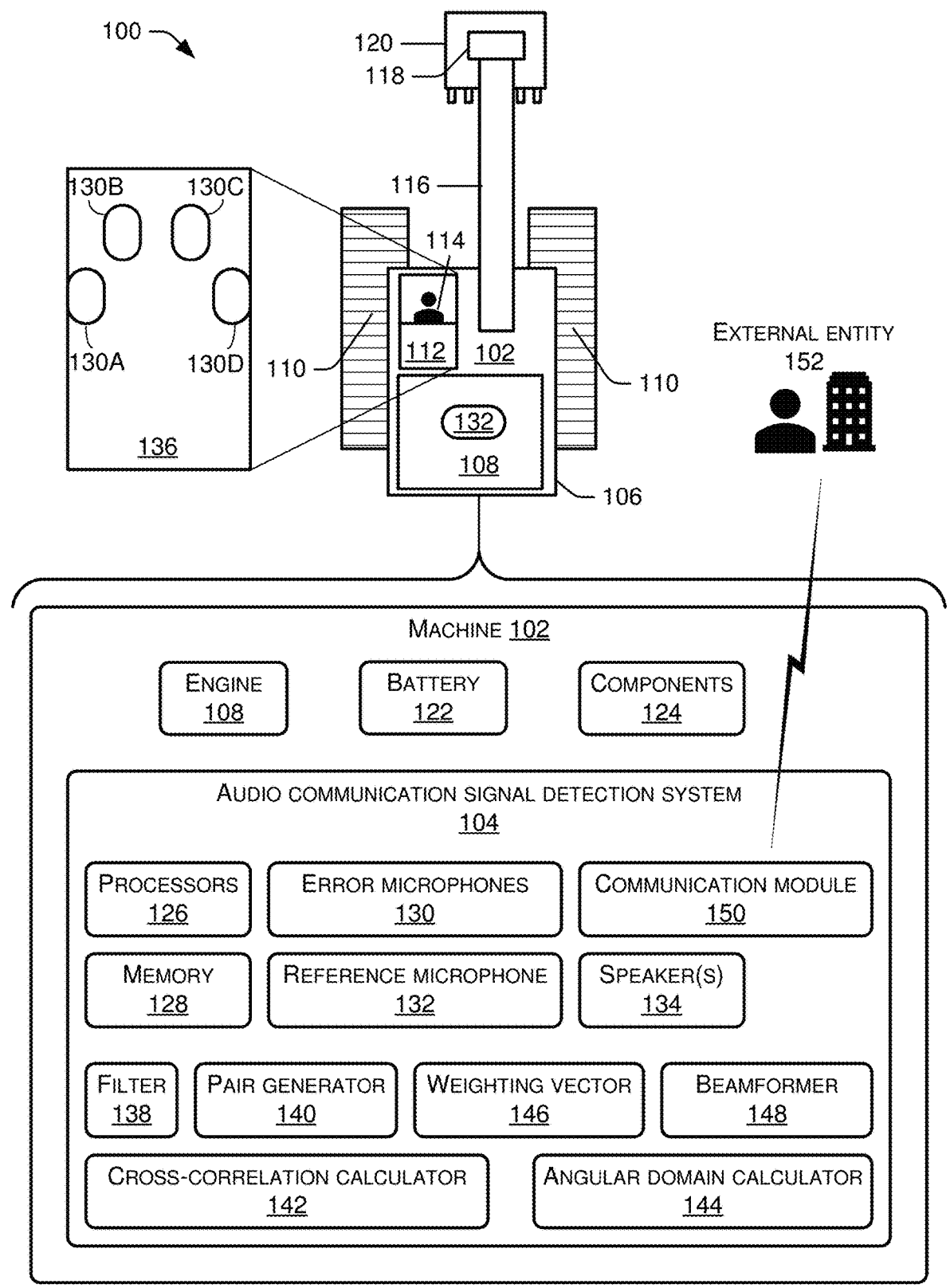
FIG. 1 illustrates a schematic top view of an example machine including an example system for detecting audio communication signals.

FIG. 1 is a block diagram depicting a schematic top view 100 of an example machine 102 including an example audio communication signal detection system 104. In this example, the machine 102 shown in FIG. 1 is an excavator. However, the machine 102 may be any type of machine configured to travel across terrain, such as an automobile, a truck, an agricultural vehicle, and/or work vehicles, such as a wheel loader, a track loader, a skid-steer loader, a grader, an on-highway truck, an off-highway truck, and/or any other machine known to a person skilled in the art.

The machine 102 includes a chassis or frame 106 to which a power source 108 is attached. The power source 108 may be an internal combustion engine or an electric motor. In this example, the power source 108 may be interchangeably referred to as an engine 108. The engine 108 is configured to supply power for operation of the machine 102, including, for example, operating work implements, electronics, and steering, and/or for supplying torque to drive members to propel or move the machine 102 across the terrain. For example, the machine 102 shown in FIG. 1 includes a pair of tracks 110 that are configured to propel the machine 102 across pavement, gravel, dirt, or other work surfaces of the worksite. Although the machine 102 includes tracks, it is contemplated that the machine 102 may include one or more wheels instead of, or in addition to, the tracks. The machine 102 also includes a cab 112 operationally connected to the frame 106 for protecting and/or providing comfort for an operator 114 of the machine 102, and/or for protecting control-related devices of the machine 102. In some examples, the machine 102 may be semi-autonomous or fully autonomous, and able to operate without an onboard or remote operator as with remote control operations.

In the example shown in FIG. 1, the machine 102 has a boom 116 with a proximal end operationally connected to the frame 106 and operational to pivot relative to the frame 106. The machine 102 also includes a stick 118 operationally connected to a distal end of boom 116 and operational to pivot relative to the boom 116. The machine 102 further includes a boom actuator (not shown) coupled at one end to the frame 106 and at an opposite end to the boom 116. The boom actuator is configured to extend and retract, thereby raising and lowering the distal end of the boom 116, respectively. The machine 102 also includes a work implement 120 for performing operations associated with the machine 102, such as digging, carrying, raising, and/or depositing material. The machine 102 includes a work implement actuator (not shown) coupled at one end to the frame 106 and/or to the proximal end of the boom 116. The work implement actuator is configured to extend and retract, thereby pivoting the work implement 120 between an upright orientation and an at least partially inverted orientation, for example. In the upright orientation, the work implement 120 may hold material and in the at least partially inverted orientation, the work implement 120 may deposit or dump the material. Other forms of work implements are contemplated. For example, although the work implement 120 in FIG. 1 is illustrated as a bucket, the work implement 120 may include augers, brushcutters, brooms, grapples, hammers, pulverizers, rippers, rotors, and so forth. The boom 116, the stick 118, the work implement 120, and the boom actuator, or any corresponding devices appropriate for a type of the machine 102, may collectively be referred to as a work tool.

As shown in FIG. 1, the machine 102 includes the audio communication signal detection system 104, the engine 108, a battery 122, and components 124 associated with operation of the machine 102, all of which may be mounted, attached, or coupled, to the frame 106. The audio communication signal detection system 104, which may be powered by the battery 122, comprises one or more processors (processors) 126, which may execute any modules, components, or systems associated with the audio communication signal detection system 104. In some examples, the processors 126 may comprise a central processing unit (CPU), a graphics processing unit (GPU), a field programmable gate array (FPGA), any combination of CPU, GPU, and FPGA, or other processing units or components known in the art. Additionally, each of the processors may possess its own local memory, which also may store program modules, program data, and/or one or more operating systems. The audio communication signal detection system 104 also comprises computer-readable storage media, or memory, 128 associated with volatile memory (e.g., RAM), non-volatile memory (e.g., ROM, flash memory, miniature hard drive, memory card, or the like), or some combination thereof. The computer-readable storage media 128 may be non-transitory computer-readable storage media.

The audio communication signal detection system 104 further comprises a plurality of error sensors 130, one or more reference sensors 132, and one or more speakers (speakers) 134. For example, the error sensors 130 may be any type of audio, vibrational, or pressure sensors or signal transducers capable of receiving and/or detecting audio signals. In this example, the error sensors 130 may be interchangeably referred to as error microphones 130. Four error microphones 130A, 130B, 130C, and 130D are used/illustrated as an example of the plurality of error sensors 130, which may be mounted equally spaced in a semicircular pattern on a roof 136 (expanded view shown) of the cab 112 for capturing audio signals including speech, or instructions, from the spotter. However, the error microphones 130 may be distributedly mounted on any exterior parts of the machine 102 where the audio signals including speech, or instructions, from the spotter may be captured. The one or more reference sensors 132 may be any type of audio, vibrational, or pressure sensors or signal transducers capable of receiving and/or detecting reference noise signals. In this example, the one or more reference sensors 132 is illustrated and referenced as a single reference microphone 132, which may be mounted in an engine compartment near the engine 108 for capturing the main noise, or undesired audio, source to be subtracted for detecting the speech from the spotter. However, the reference microphone 132 may alternatively, or additionally, be mounted near any significant noise source(s) associated with the 102. Further, the speakers 134 may be mounted inside the cab 112 for reproducing the speech for the operator 114. The audio communication signal detection system 104 further comprises at least one of a filter 138, a pair generator 140, a cross-correlation calculator 142, an angular domain calculator 144, a weighting vector 146, or a beamformer 148. These modules, or components, will be discussed below in more detail with reference to FIGS. 2-13.

The computer-readable storage media 128 may include, or be associated with, one or more of the above-noted modules, which perform various operations associated with the audio communication signal detection system 104. In some examples, one or more of the modules may include or be associated with computer-executable instructions that are stored by the computer-readable storage media 128 and that are executable by the processors 126 to perform such operations. The audio communication signal detection system 104 may also comprise a communication module 150 for communicating with an external entity 152 using any known wired and/or wireless communication protocols and/or networks. For example, the speech reproduced inside the cab 112 by the speaker 134 may also be communicated to the external entity 152, such as a central office for the operator 114 and/or the machine 102. The audio communication signal detection system 104 may also comprise additional components not listed above that may perform any function associated with the audio communication signal detection system 104.

As will be described below, in some examples, the plurality of error microphones 130 disposed on the roof 136 of the cab 112 may capture an audio signal including the speech and the reference microphone 132 disposed near the engine 108 may capture a reference noise signal, which may also include low-level speech. The filter 138 may remove at least a portion of the reference noise signal from the captured audio signals and generate plurality of partially processed audio signals. The pair generator 140 may pair a plurality of partially processed audio signals with each other to form a plurality of partially processed audio signal pairs. The plurality of partially processed audio signal pairs comprises combination pairs, not permutation pairs, that is an order of a combination does not matter (ex., AB is the same as BA). For each partially processed audio signal pair, the cross-correlation calculator 142 may generate a cross-correlation vector, remove effects of low frequency contents from the cross-correlation vector (modified cross-correlation vector), and the angular domain calculator 144 may then convert the modified cross-correlation vector to an angular domain cross-correlation vector. The angular domain calculator 144, may rotate the angular domain cross-correlation vector by a physical angle between the corresponding error microphone locations. The angular domain calculator 144 may then sum all of the rotated angular domain cross-correlation vectors and generate a summed angular domain cross-correlation vector. The weighting vector 146 may selectively suppress portions of the summed angular domain cross-correlation vector based on angles and identify the likely direction of arrival, or the direction information of the speech. The beamformer 148 may then apply the direction information for processing audio signals from the filter 138, and the speaker 134 may reproduce the processed audio signals associated with the speech.

Figure 2:
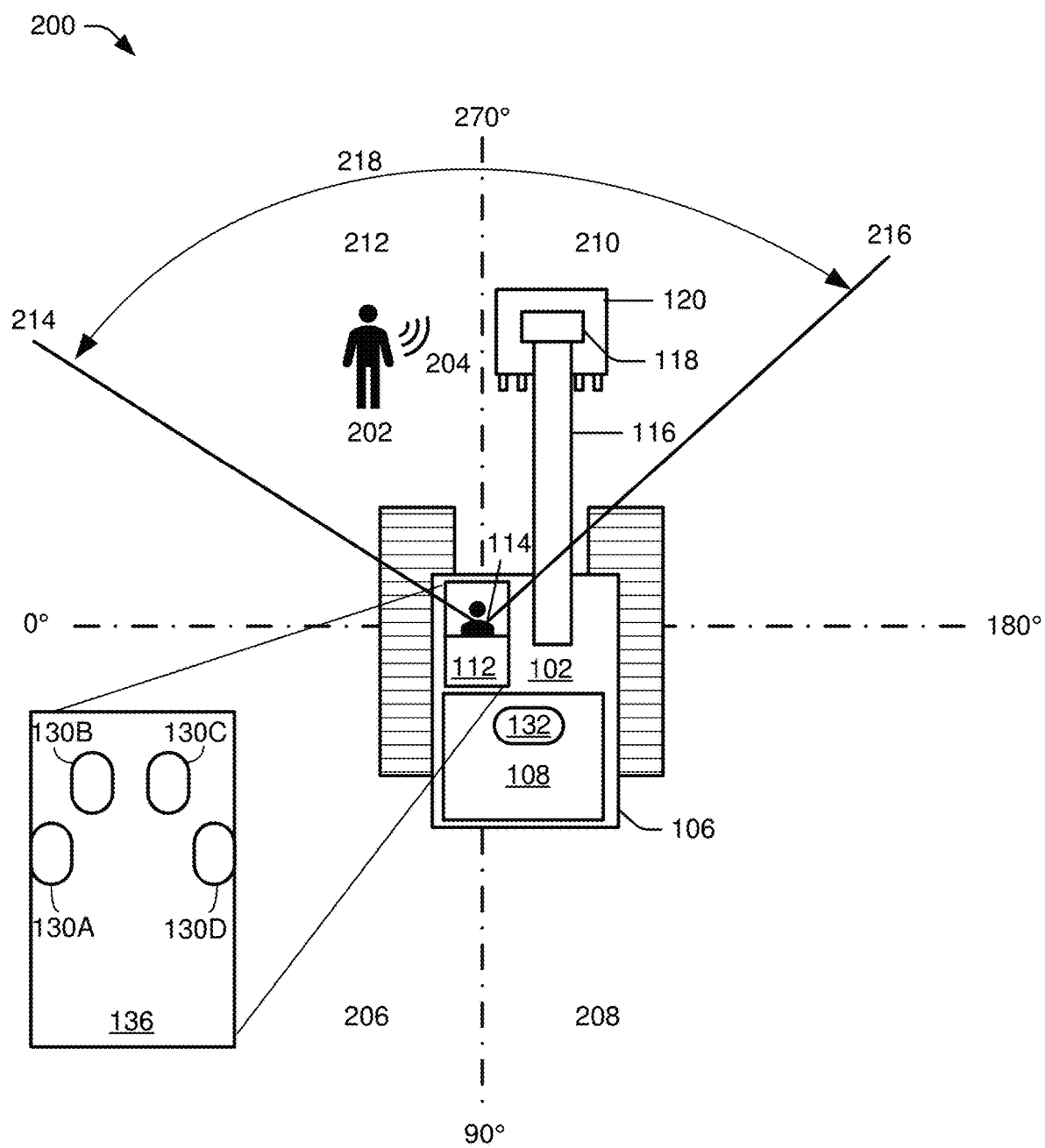
FIG. 2 illustrates a schematic diagram depicting a schematic top view of an example work site including the machine having the audio communication signal detection system and a spotter providing verbal instructions.

FIG. 2 illustrates a schematic diagram depicting a schematic top view of an example work site 200 including the machine 102 having the audio communication signal detection system 104 and a spotter 202 providing verbal instructions, or speech, 204 to the operator 114. The spotter 202 may be located on the same level ground as the machine 102, on a platform higher than the machine 102, or in a lower level such as a ditch. The audio communication signal detection system 104 is not specifically illustrated in FIG. 2 but is understood to be present as a part of, or installed on, the machine 102 as described with reference to FIG. 1. A surrounding area of the machine 102 is marked and separated into four quadrants, 206, 208, 210, 212, as separated by axes showing angles 0°, 90°, 180°, and 270°, centered about the cab 112 and the operator 114. The spotter 202 is shown to be located in the fourth quadrant 212. The location of the spotter 202 is within an area defined by lines 214 and 216 (a spotter area 218), which is known to be a likely area for a spotter to be for providing instructions.

Figure 3:
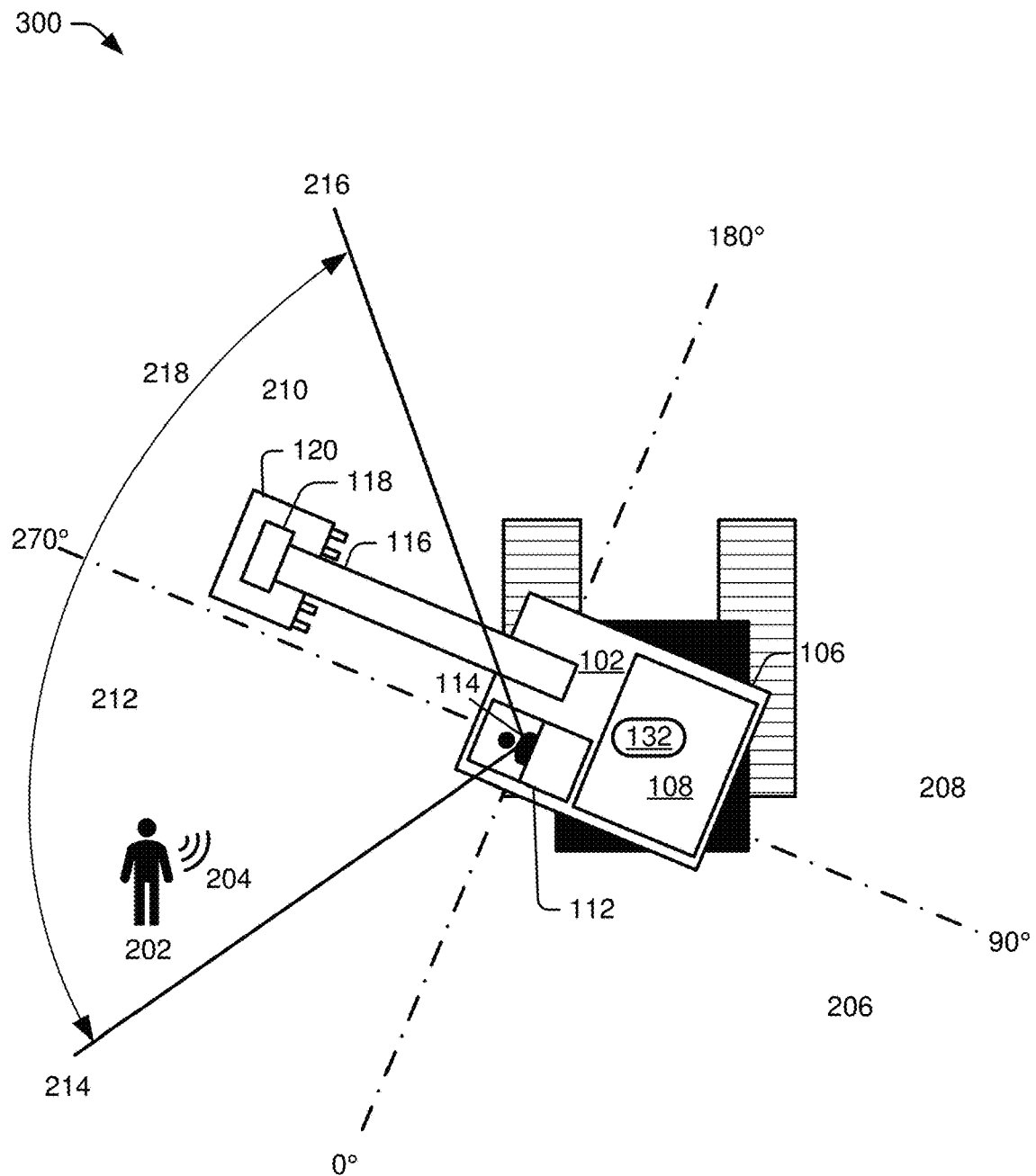
FIG. 3 illustrates a schematic diagram depicting a schematic top view of the example work site with a portion of the machine turned to the left.

FIG. 3 illustrates a schematic diagram depicting a schematic top view of the example work site 300 with a portion of the machine 102 turned to the left. More accurately, the top portion of the machine 102, which includes the engine 108, the cab 112, the boom 116, the stick 118, and the work implement 120, has rotated about a substantially vertical central axis while the machine 102 itself has remained in the same position. Because the coordinates, or the quadrants 206, 208, 210, and 212 are set relative to the cab 112, that is, relative to the operator 114, while the spotter 202 may move as the machine 102 turns, the spotter area 218 remains fixed relative to the operator 114.

Figure 4:
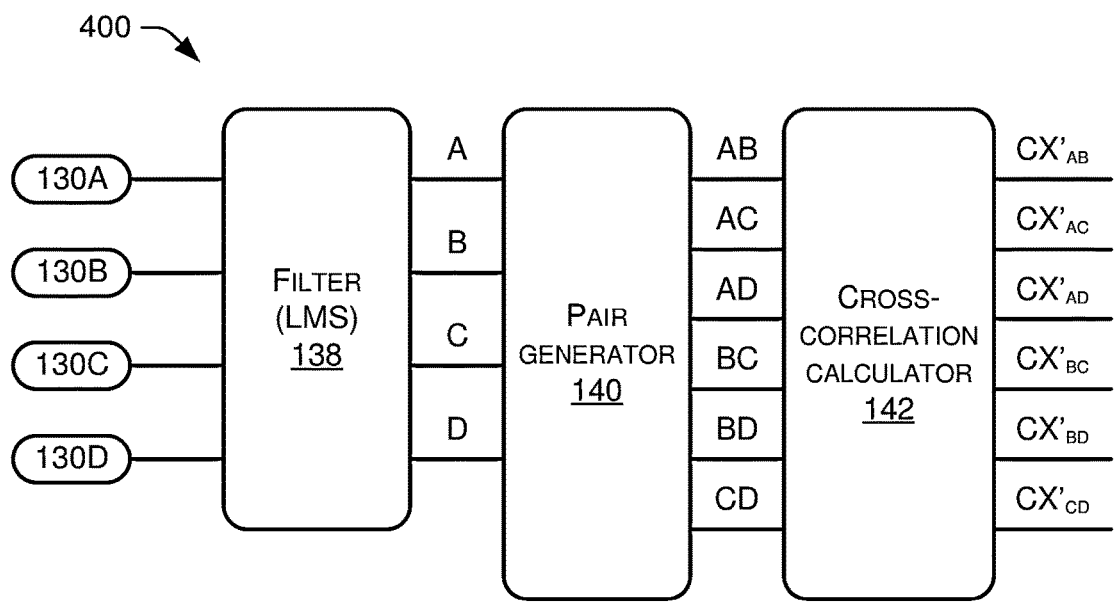
FIG. 4 illustrates a block diagram of the modules for processing the plurality of captured audio signals for generating the modified cross-correlation vectors.

FIG. 4 illustrates a block diagram 400 of the modules for processing the plurality of captured audio signals for generating the modified cross-correlation vectors. Each of the plurality of error microphones, 130A, 130B, 130C, and 130D may capture a corresponding audio signal including the speech 204 and, together, generate a plurality of captured audio signals. The reference microphone 132 located, in this example, near the engine 108, which is a primary noise source, may capture a reference noise signal from the engine 108. The filter 138 may then remove at least a portion of the reference noise signal from each captured audio signal of the plurality of captured audio signals and generate a plurality of partially processed audio signals. The filter 138 may apply a least mean square (LMS) filtering to each captured audio signal of the plurality of audio signals to remove the at least a portion of the reference noise signal. The pair generator 140 may pair each of the plurality of partially processed audio signals and generate a plurality of partially processed audio signal pairs.

For example, if a partially processed audio signal associated with the error microphone 130A is A, a partially processed audio signal associated with the error microphone 130B is B, a partially processed audio signal associated with the error microphone 130C is C, and a partially processed audio signal associated with the error microphone 130D is D, then the plurality of partially processed audio signal pairs would comprise AB, AC, AD, BC, BD, and CD. In other words, the plurality of partially processed audio signal pairs comprises only combinations, not permutations, of partially processed audio signals.

For each partially processed audio signal pair of the plurality of partially processed audio signal pairs, the cross-correlation calculator 142 may calculate and generate a cross-correlation vector, CX. For example, for the AB partially processed audio signal pair, the cross-correlation calculator 142 may generate a cross-correlation vector, $CX_{AB}$. The cross-correlation vectors for the remaining pairs, $CX_{AC}$, $CX_{AD}$, $CX_{BC}$, $CX_{BD}$, and $CX_{CD}$, are similarly calculated and generated. The cross-correlation vector may be further processed, or modified, to remove effects of low frequency contents from the cross-correlation vector. For example, a modified cross-correlation vector may be calculated based on an equation below.

$$CX_m = CX - \frac{1 - |\Delta S|}{L^2} \sum CX \quad (1)$$

where:
$CX_m$ is the modified cross-correlation vector,
CX is the original cross-correlation vector,
L is the window length,
$\Delta s = [-L+1, -L+2, \ldots, L-2, L-1]$, and
| | is an element-wise absolute value operator.

Figure 5:
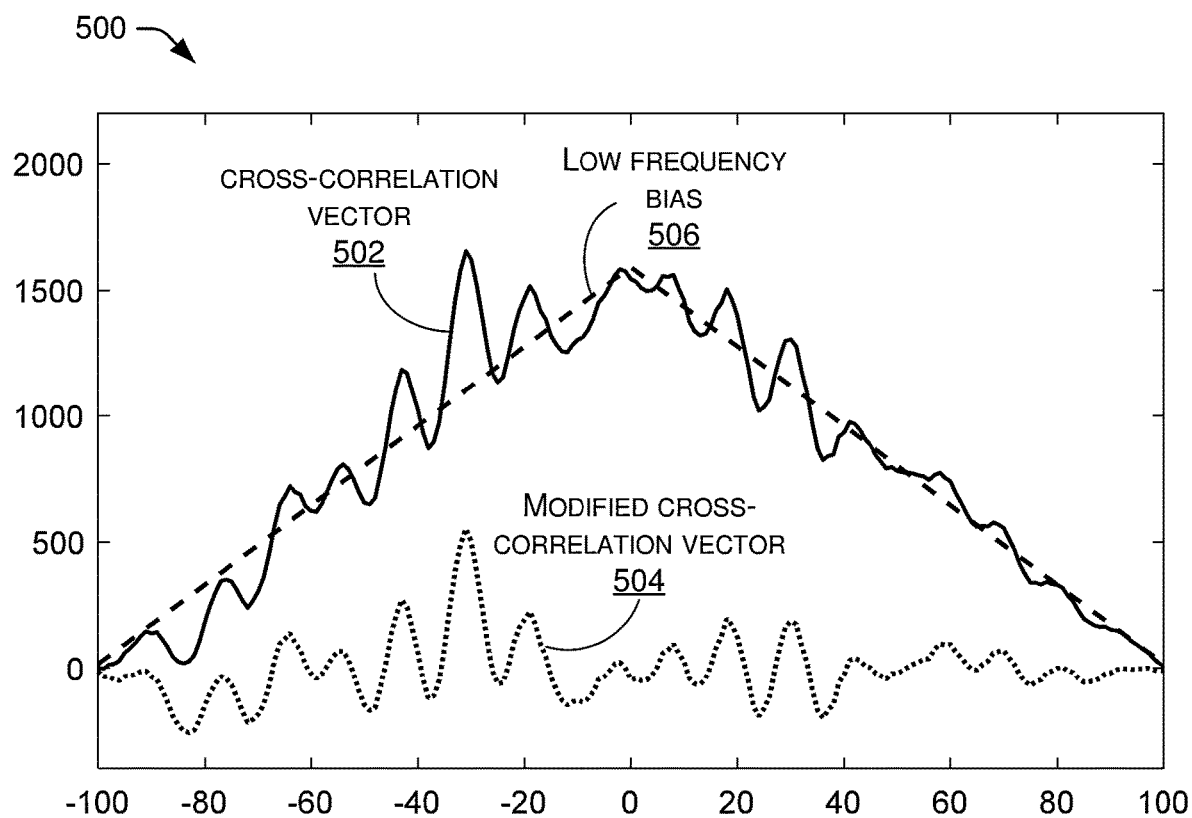
FIG. 5 illustrates an example comparison of a cross-correlation vector with and without effects of low frequency contents removed.

FIG. 5 illustrates an example comparison 500 of a cross-correlation vector 502 and a modified cross-correlation vector 504 having effects of low frequency contents (low frequency bias 506) removed. Referring back to FIG. 3, the modified cross-correlation vectors, $CX'_{AB}$, $CX'_{AC}$, $CX'_{AD}$, $CX'_{BC}$, $CX'_{BD}$, and $CX'_{CD}$, are illustrated as outputs from the cross-correlation calculator 142.

Figure 6:
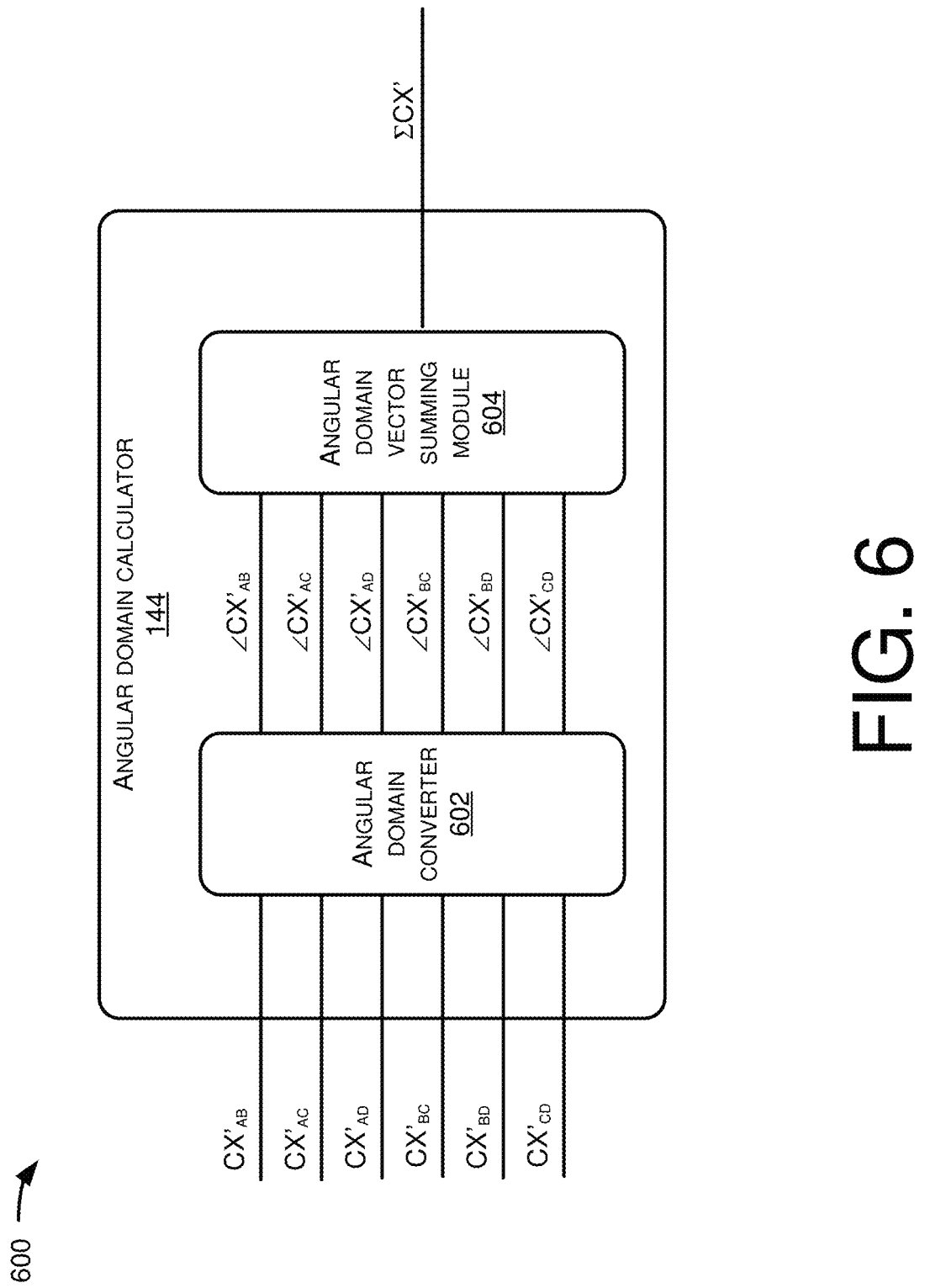
FIG. 6 illustrates an example block diagram describing functions of the angular domain calculator.

FIG. 6 illustrates an example block diagram 600 describing functions of the angular domain calculator 144. The angular domain calculator 144 may comprise an angular domain converter 602 operational to convert the modified cross-correlation vectors to corresponding angular domain cross-correlation vectors based on a spatial relationship between the error microphone pairs and the sample shift value. For example, the angular domain converter 602 may convert each of the modified cross-correlation vectors, $CX'_{AB}$, $CX'_{AC}$, $CX'_{AD}$, $CX'_{BC}$, $CX'_{BD}$, and $CX'_{CD}$, to a corresponding angular domain cross-correlation vector, $\angle CX'_{AB}$, $\angle CX'_{AC}$, $\angle CX'_{AD}$, $\angle CX'_{BC}$, $\angle CX'_{BD}$, and $\angle CX'_{CD}$, respectively. Each modified cross-correlation vector is in the sample domain, where each value in the vector corresponds to a different time-shift, measured in samples, between the two time-domain signals. Before these cross-correlation vectors can be combined into a single composite vector, they must be transformed into the same domain. For simplicity in later calculations, this is accomplished by transforming each cross-correlation vector into the angular domain.

Figure 7:
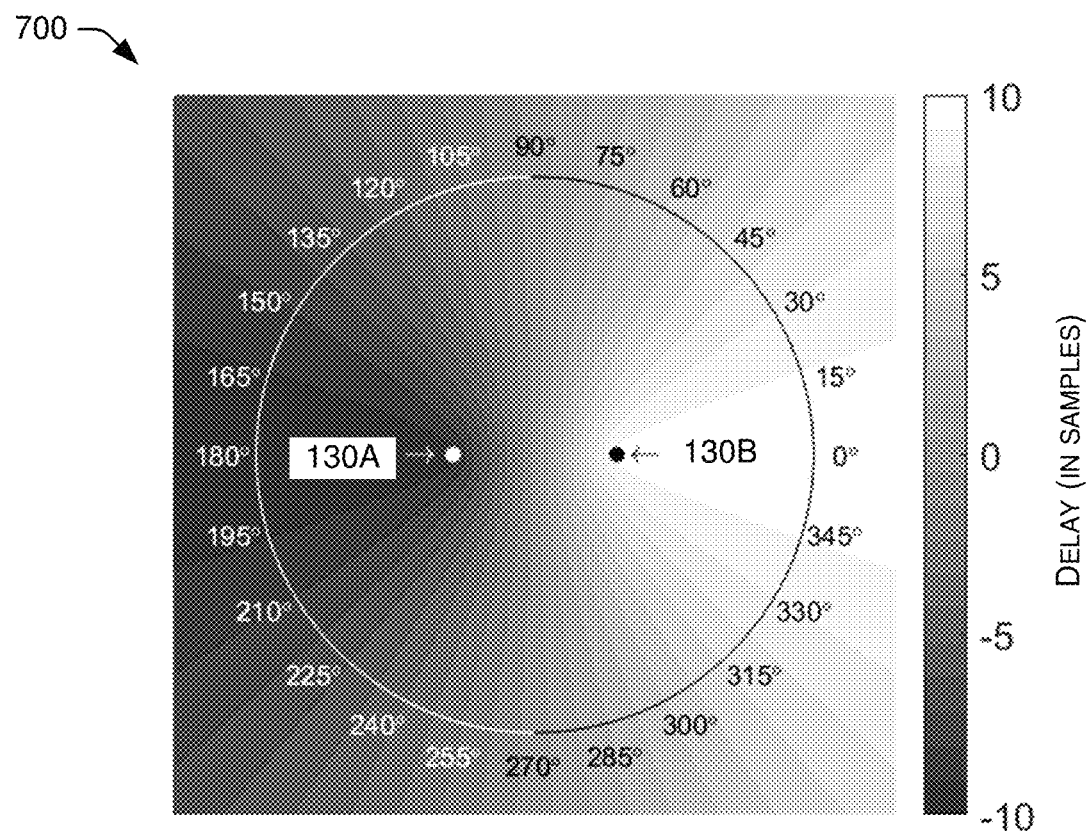
FIG. 7 illustrated an example graphical depiction of the relationship between the domain of the modified cross-correlation vector and the angular domain.
Figure 8:
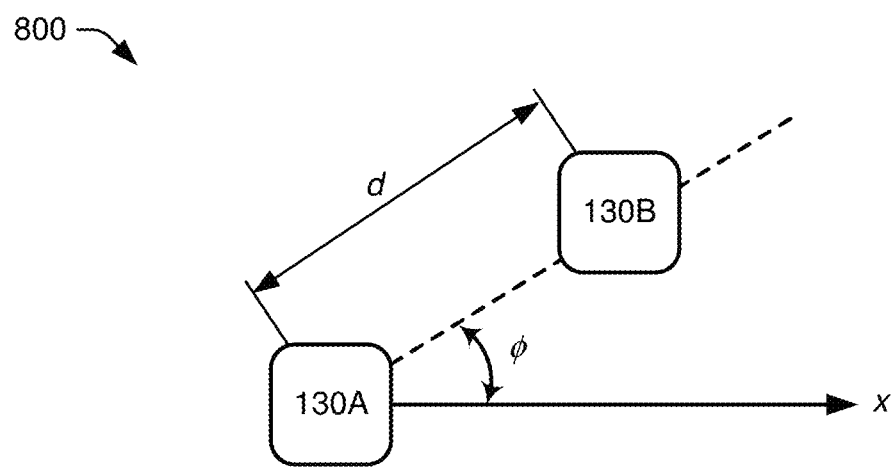
FIG. 8 illustrates a schematic diagram of an error microphone pair setup associated with the angular domain conversion.

FIG. 7 illustrates an example graphical depiction 700 of the relationship between the domain of the modified cross-correlation vector and the angular domain. The bands represent sample delays. The purpose of the transformation is to assemble the values from the cross-correlation vector into a new vector, where the values correspond to linearly spaced angles, rather than sample delays. FIG. 8 illustrates a schematic diagram 800 of an error microphone pair (130A and 130B) setup and parameters associated with the angular domain conversion. A signal with a physical source anywhere within a band will arrive at the error microphones 130A and 130B with the corresponding delay in samples. Each band in turn corresponds with a single element of the cross-correlation vector.

An example process to carry out the transformation is described below. A vector of the angles of interest, $A_0$, may first be generated. For instance, if resolution of one degree is desired, $A_0$ may be defined as:

$$A_0 = [1, 2, 3, \ldots, 359, 360] \quad (2)$$

This vector, $A_0$, may be converted to radians and rotated by $\phi$, which is the angle between the global x axis and a line connecting the two error microphones 130A and 130B as shown in FIG. 8.

$$A_1 = A_0 \frac{\pi}{180} - \phi \quad (3)$$

Next, the transformation vector T may be calculated, which defines the relationship between the domain of the modified cross-correlation and the angular domain.

$$T = \text{round}\left(L - \cos(A_1)\frac{d \cdot F_s}{c}\right) \quad (4)$$

where d is the distance between the two error microphones 130A and 130B, Fs is the sampling frequency, and L is the number of samples included in each signal when the modified cross-correlation is calculated. The values of T are rounded to the nearest integer. The angular domain cross-correlation vector $\angle CX'_{AB}$ is then assembled from the modified cross-correlation vector $CX'_{AB}$ as:

$$\angle CX'_{AB} = CX'_{AB}(T) \quad (5)$$

Equation (5) is an indexing operation where the members of T are the ordered indices of $CX'_{AB}$ that form $\angle CX'_{AB}$. For example, if A=[1, 4, 3], then B=C (A) would define B as the first element of C, followed by the fourth, followed by the third. Note that in equation (5), $\angle CX'_{AB}$ and T are always the same length, but they may have a different length from $\angle CX'$. In most cases, T will also contain duplicate values, because, as can be seen in FIG. 7, multiple angles fall within the same sample delay band (such as 135° and 225°). Equations (2)-(5) may then be combined, as shown below, to convert a modified cross correlation from any pair of error microphones into an arbitrary angular domain.

$$\angle CX'_{AB} = CX'\left(\text{round}\left(L - \cos\left(A_0\frac{\pi}{180} - \phi\right)\frac{d \cdot F_s}{c}\right)\right) \quad (6)$$

Figure 9:
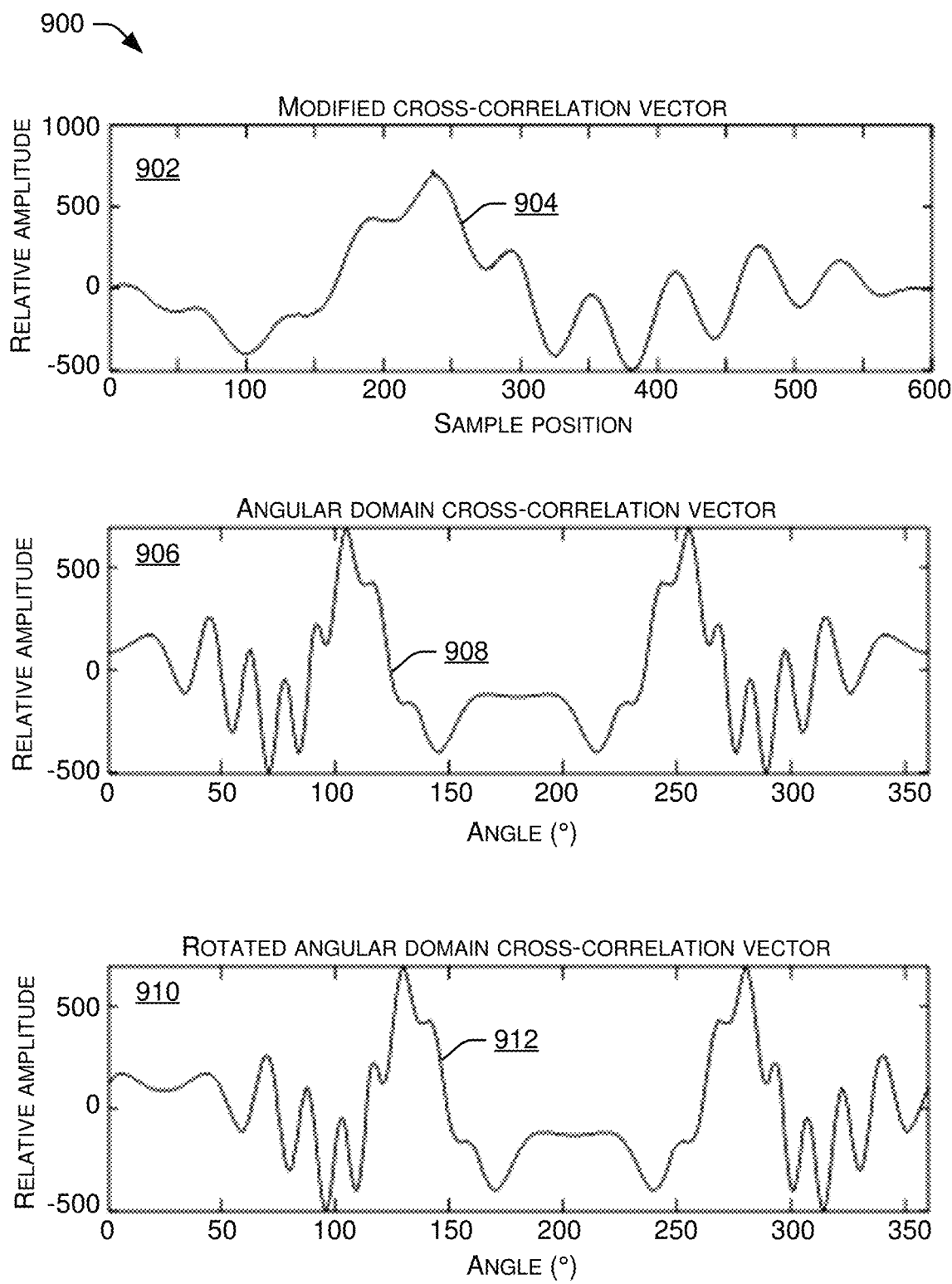
FIG. 9 illustrates example signal profiles in the domain conversion process.

FIG. 9 illustrates example signal profiles 900 in the domain conversion process. As described above with reference to FIGS. 4 and 5, a graph 902 illustrates an example modified cross-correlation vector 904 having effects of low frequency contents removed. Although it may be understood that the domain conversion of the modified cross-correlation vector to the angular domain may occur as a single step according to Equation (6), the effects of the domain conversion and the angle rotation are separately illustrated to better visualize the domain conversion process. A graph 906 illustrates an example angular domain cross-correlation vector 908, which is converted from the modified cross-correlation vector 904. The angular domain cross-correlation vector 908 shows a symmetry about 180°, and peaks at about 105° and 255° that may indicate initial directions of a possible audio signal. A graph 910 illustrates an example rotated angular domain cross-correlation vector 912, which is the angular domain cross-correlation vector 908 rotated, or corrected, by a corresponding angle, $\phi$, between the line connecting the associated pair of error microphones, such as the error microphones 130A and 130B, and the global x-axis as described above with reference to FIG. 8.

Figure 10:
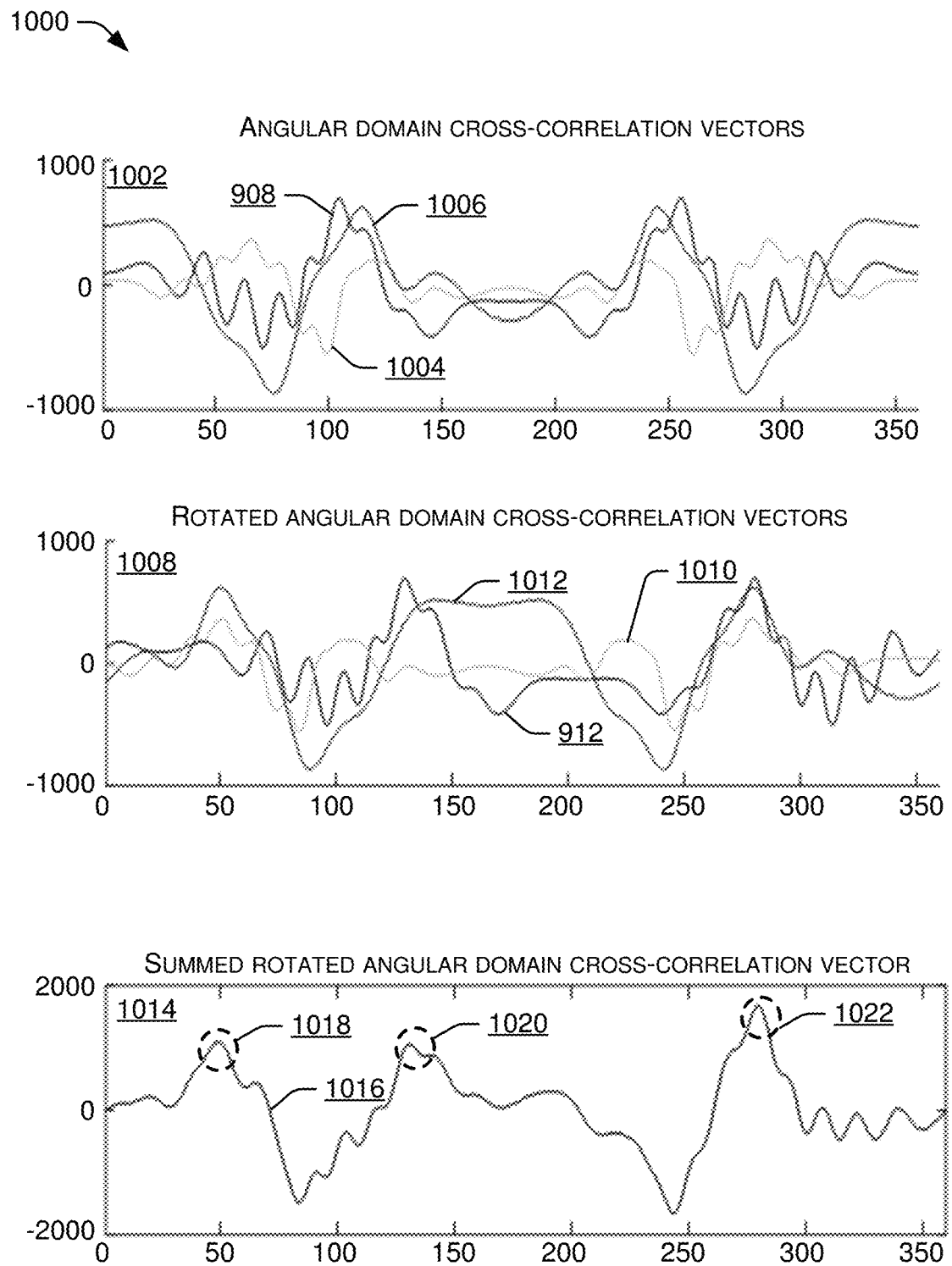
FIG. 10 illustrates example signal profiles for generating a summed angular domain cross-correlation vector.

FIG. 10 illustrates example signal profiles 1000 for generating summed angular domain cross-correlation vector. In this example, the error microphones 130 involved may be the error microphones 130A, 130B, and 130C and the pair generator may output three pairs AB, AC, and BC, which the cross-correlation calculator 142 as modified cross-correlation vectors, $CX'_{AB}$, $CX'_{AC}$, and $CX'_{BC}$, as described in reference to FIGS. 4 and 5. Similar to FIG. 9, the effects of the domain conversion and the angle rotation are separately illustrated to better visualize the domain conversion process. In a graph 1002, three angular domain cross-correlation vectors, 908 from FIGS. 9, 1004, and 1006, are shown. As shown in the graph 1002, all of the three angular domain cross-correlation vectors 908, 1004, and 1006 are symmetric about 180°. In a graph 1008, three rotated angular domain cross-correlation vectors, 912, 1010, and 1012 are shown. Each of the three angular domain cross-correlation vectors 908, 1004, and 1006 is rotated by the corresponding angle, $\phi$, and output as the rotated three angular domain cross-correlation vectors, 908, 1004, and 1006, respectively, corresponding to the outputs $\angle CX'_{AB}$, $\angle CX'_{AC}$, and $\angle CX'_{BC}$ from the angular domain converter 602 as shown in FIG. 5. For example, the angular domain cross-correlation vectors 908 is shown to have been rotated by about 25°; the angular domain cross-correlation vectors 1004 by about −15°; and the angular domain cross-correlation vectors 1006 by about 165°.

In a graph 1014, a summed rotated angular domain cross-correlation vector 1016 is shown, which is a result of summing the rotated angular domain cross-correlation vectors 912, 1010, and 1012, corresponding to the output, $\Sigma CX'$, from the angular domain vector summing module 604. The summed rotated angular domain cross-correlation vector 1016 shows three peaks, 1018, 1020, and 1022, around 50°, 130°, and 280°, respectively, indicating three candidates for the directions of the audio signal including the speech 204. To determine which peak is the most likely direction of the audio signal, the weighting vector 146 is applied to the summed rotated angular domain cross-correlation vector 1016 as described below.

Figure 11:
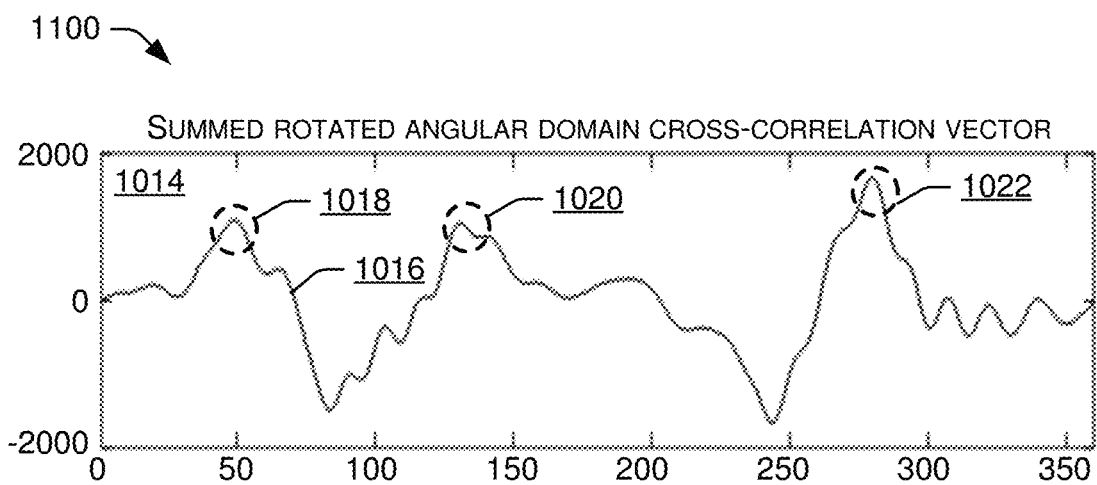
FIG. 11 illustrates an example application of the weighting vector to the summed rotated angular domain cross-correlation vector.
Figure 11:
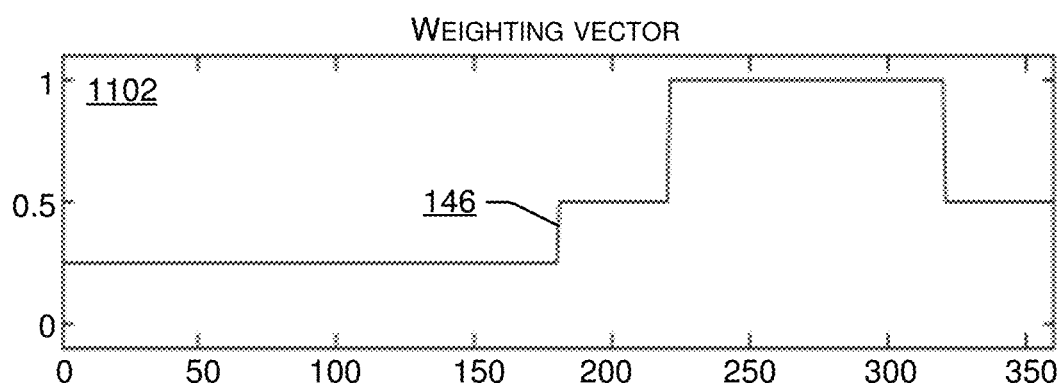
Figure 11:
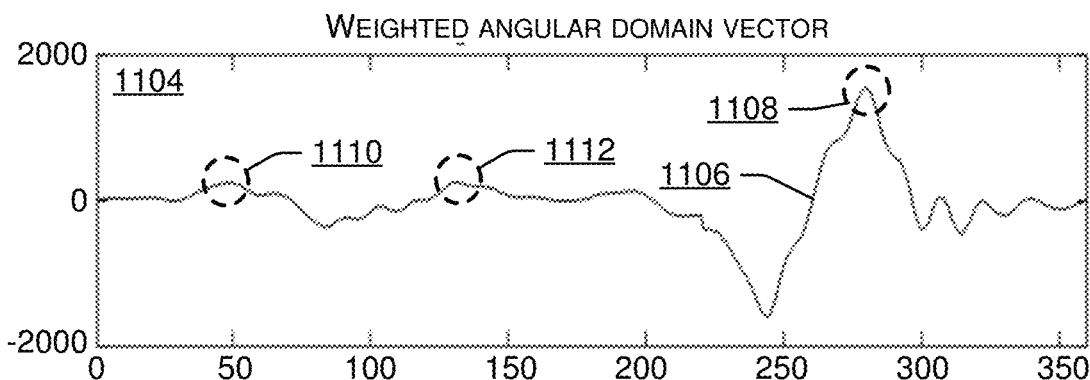

FIG. 11 illustrates an example representation 1100 of applying the weighting vector 146 to the summed rotated angular domain cross-correlation vector 1016. The graph 1014 shows the summed rotated angular domain cross-correlation vector 1016, as described above with reference to FIG. 8, to which the weighting vector 146 is to be applied. The weighting vector 146 is shown in a graph 1102 having a filtering shape that favors the spotter area 218 and biases against the direction of the noise source as described above. As can be seen with reference to FIGS. 2 and 3, the weighting factor of 1 corresponds approximately to the spotter area 218 defined by the lines 214 and 216, a range of approximately 220° to 320°, and the weighting factor is reduced as the angle from the operator 114 approaches towards the engine 108 at 90°. A graph 1104 shows a weighted angular domain vector 1106, a result of the weighting vector 146 applied to the summed rotated angular domain cross-correlation vector 1016. The weighted angular domain vector 1106 shows a relative peak 1108 (the relative peak 1022 unsuppressed), which indicates the most likely direction of the desired audio signal, at an angle within the spotter area 218. In this example, the relative peak 1108 is located approximately 280°. The weighted angular domain vector 1106 also shows that the relative peaks 1018 and 1020 have been suppressed by the weighting vector 146, and are shown as suppressed peaks 1110 and 1112, respectively. This direction information of the relative peak 1108 at 280° may also be used, when generating a reproduced speech in the cab 112, to simulate the direction of the spotter 202, who is located at about 280°.

Figure 12:
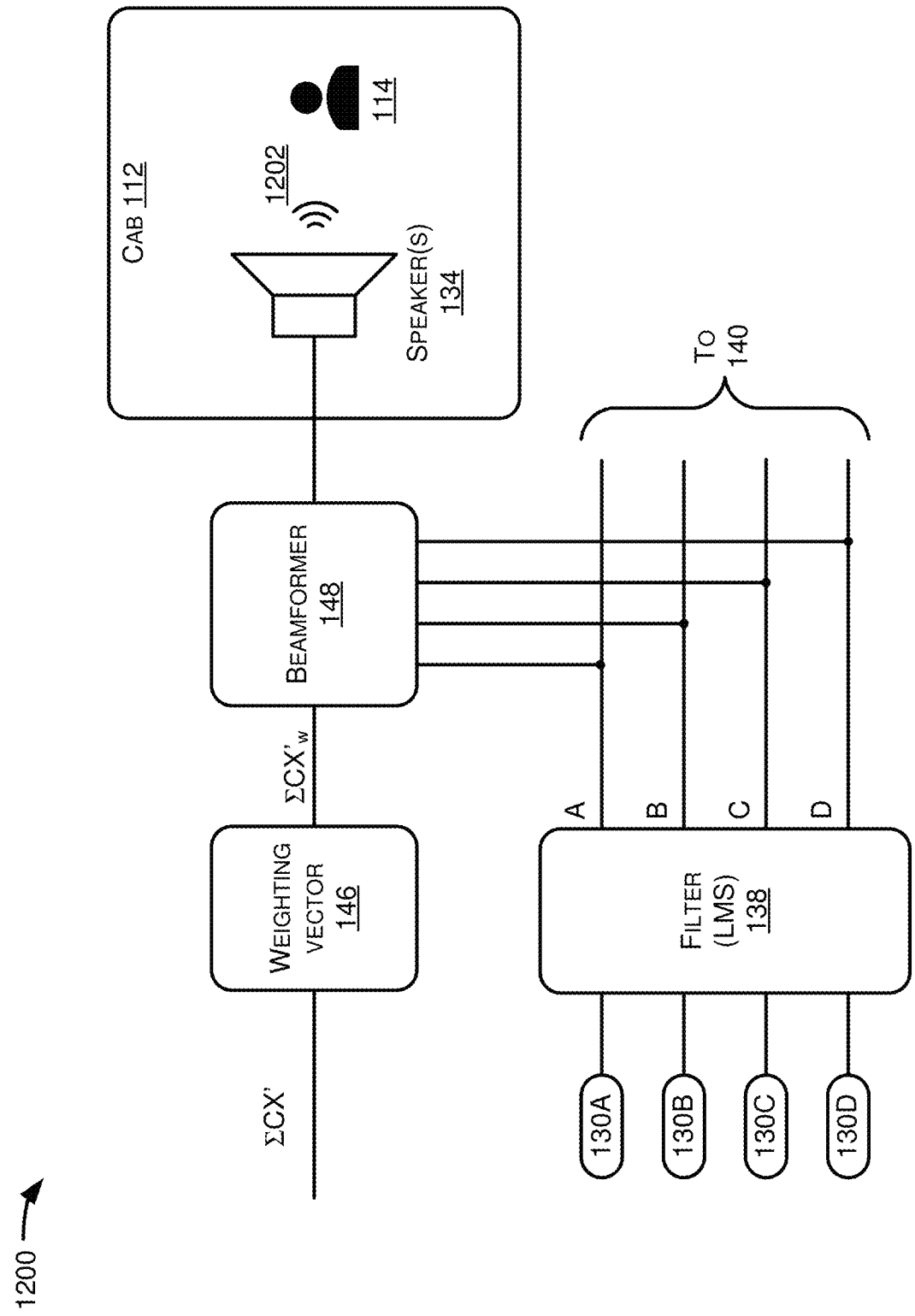
FIG. 12 illustrates a block diagram of the weighting vector, the beamformer, filter, and speakers for processing the audio signals based on direction information.

FIG. 12 illustrates a block diagram 1200 of the weighting vector 146, the beamformer 148, the filter 138, and speakers 134 for processing the audio signals based on direction information.

The weighting vector 146 may apply, to the summed rotated angular domain cross-correlation vector 1016, a filter that is shaped to favor the spotter area 218, which is known to be a likely area for the spotter 202 to be for providing the speech 204, and biased against a direction of the noise source, such as the engine 108. For example, the spotter 202 is unlikely to position himself behind the cab 112 where the operator 114 cannot see him and the speech 204 is highly likely to be blocked by the noise from the engine 108. In other words, the weighting vector 146 is designed to generate a weighted angular domain vector, $\Sigma CX'_w$, which identifies the most likely direction of the audio signal by effectively passing through the audio signals determined to originate from the spotter area 218 without any suppression while reducing the audio signals determined to originate from the direction of the engine 108, which is the main noise source. The beamformer 148 may then utilize the direction information from the weighted angular domain vector, to set a look direction of the beamformer 148, beamform the plurality of partially processed audio signals from the filter 138 based on the look direction, and output the desired audio signal, which is a recovered version of the speech 204. The output from the beamformer 148 may then be played as a reproduced speech 1202 associated with the speaker 204 by the speaker 134 in the cab 112 for the operator 114. In some examples, the reproduced speech 1202 may be generated by the speakers 134 in a way to indicate for the operator 114 the direction of the spotter 202, or the speech 204, relative to the operator 114 based on the direction information from the weighted angular domain vector, $\Sigma CX'_w$.

Figure 13:
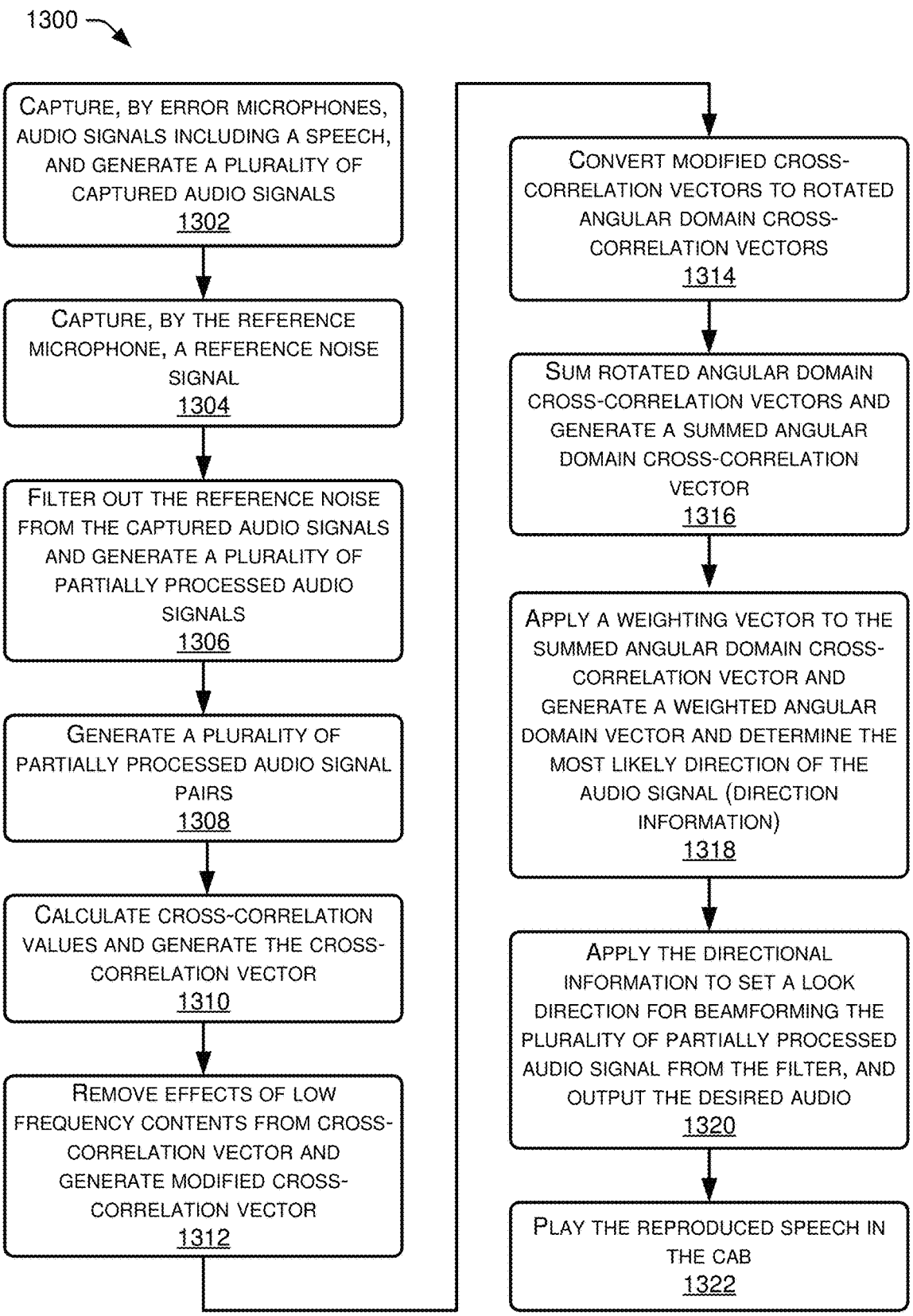
FIG. 13 provides a flow chart representing an example process for detecting audio communication signals present in a high noise environment.

FIG. 13 provides a flow chart representing an example process 1300 for detecting audio communication signals present in a high noise environment. The process 1300 is illustrated as a logical flow graph, operation of which represents a sequence of operations that can be implemented in hardware, software, or a combination thereof. In the context of software, the operations represent computer-executable instructions stored on one or more computer-readable storage media that, when executed by one or more processors, perform the recited operations. For the purpose of discussion, unless otherwise specified, FIG. 13 will be described below with respect to the processors 126 of the audio communication signal detection system 104 performing the steps. Generally, computer-executable instructions include routines, programs, objects, components, data structures, and the like that perform particular functions or implement particular data types. The order in which the operations are described is not intended to be construed as a limitation, and any number of the described operations may be combined in any order and/or in parallel to implement the process.

In some examples, the processors 126 may control the plurality of error microphones, 130A, 130B, 130C, and 130D to capture a corresponding audio signal including the speech 204 and generate a plurality of captured audio signals at block 1302. The processors 126 may generate the captured audio signal by sampling the audio signal at a preselected sampling frequency. The processors 126 may also control the reference microphone 132, located near the engine 108, to capture a reference noise signal (main noise), which may also include low-level speech, from the engine 108 at block 1304. At block 1306, the processors 126 may filter out at least a portion of the reference noise signal from each captured audio signal of the plurality of captured audio signals, for example, by using a least mean square (LMS) filtering, and may generate a plurality of partially processed audio signals. From the plurality of partially processed audio signals, the processors 126 may, by utilizing the pair generator 140, generate partially processed audio signal pairs at block 1308. As discussed above with reference to FIG. 3, the plurality of partially processed audio signal pairs comprises pairs that are combinations, not permutations, of partially processed audio signals, that is an order of a combination does not matter (ex., AB is the same as BA). For example, if a partially processed audio signal associated with the error microphone 130A is A, a partially processed audio signal associated with the error microphone 130B is B, a partially processed audio signal associated with the error microphone 130C is C, and a partially processed audio signal associated with the error microphone 130D is D, then the plurality of partially processed audio signal pairs would comprise AB, AC, AD, BC, BD, and CD.

For each partially processed audio signal pair, the processors 126 may, by utilizing the cross-correlation calculator 142, calculate and generate a cross-correlation, for example, $CX_{AB}$, $CX_{AC}$, $CX_{AD}$, $CX_{BC}$, $CX_{BD}$, and $CX_{CD}$ for AB, AC, AD, BC, BD, and CD pairs, respectively, as described above with reference to FIG. 3, at block 1310. At block 1312, the processors 126 may, by utilizing the cross-correlation calculator 142, remove effects of low frequency contents from the cross-correlation vectors to generate modified cross-correlation vectors, $CX'_{AB}$, $CX'_{AC}$, $CX'_{AD}$, $CX'_{BC}$, $CX'_{BD}$, and $CX'_{CD}$, for example, as described above with reference to FIG. 3, shown as outputs from the cross-correlation calculator 142. For example, a modified cross-correlation vector may be calculated based on Equation (1) as discussed above.

At block 1314, the processors 126 may, by utilizing the angular domain converter 602, convert the modified cross-correlation vectors into rotated angular domain cross-correlation vectors based on a spatial relationship between the error microphone pairs and the sample positions as described above with reference to FIGS. 6-9. For example, the processors 126 may, by utilizing the angular domain convert 602, convert each of the modified cross-correlation vectors, $CX'_{AB}$, $CX'_{AC}$, $CX'_{AD}$, $CX'_{BC}$, $CX'_{BD}$, and $CX'_{CD}$, to a corresponding rotated angular domain cross-correlation vector, $\angle CX'_{AB}$, $\angle CX'_{AC}$, $\angle CX'_{AD}$, $\angle CX'_{BC}$, $\angle CX'_{BD}$, and $\angle CX'_{CD}$, respectively, based on Equations (2)-(6) as described above with reference to FIGS. 7 and 8.

At block 1316, the processors 126 may, by utilizing the angular domain vector summing module 604, sum the rotated angular domain cross-correlation vectors and generate a summed angular domain cross-correlation vector as described above with reference to FIGS. 6 and 10. As described above with reference to FIGS. 6 and 10, in the graph 1014, the summed rotated angular domain cross-correlation vector 1016 is shown, which is a result of summing the rotated angular domain cross-correlation vectors 912, 1010, and 1012, corresponding to the output, $\Sigma CX'$, from the angular domain vector summing module 604. The summed rotated angular domain cross-correlation vector 1016 shows three peaks, 1018, 1020, and 1022, around 50°, 130°, and 280°, respectively, indicating three candidates for the directions of the audio signal including the speech 204. To determine which peak is as the most likely direction of the audio signal, the weighting vector 146 is applied to the summed rotated angular domain cross-correlation vector 1016 as described below.

At block 1318, the processors 126 may apply the weighting vector 146, to the summed rotated angular domain cross-correlation vector 1016. As discussed above with reference to FIGS. 11 and 12, the weighting vector 146 is designed to generate the weighted angular domain vector 1106, which identifies the most likely direction of the audio signal, by effectively passing through the audio signals determined to originate from the spotter area 218 without any suppression while reducing the audio signals determined to originate from the direction of the engine 108. As described above with reference to FIG. 11, the weighted angular domain vector 1106 shows a relative peak 1108 (the relative peak 1022 unsuppressed), which include the most likely direction of the speech 204, at an angle within the spotter area 218. In this example, the relative peak 1108 is located approximately 280°. The weighted angular domain vector 1106 also shows that the relative peaks 1018 and 1020 have been suppressed by the weighting vector 146, and are shown as suppressed peaks 1110 and 1112, respectively. This direction information of the relative peak 1108 at 280° may also be used, when generating the reproduced speech 1202 in the cab 112, to simulate the direction of the spotter 202, who is located at about 280°.

At block 1320, the processors 126 may, by utilizing the beamformer 148, apply the directional information from the weighted angular domain vector 1106 to set a look direction of the beamformer 148, beamform the plurality of partially processed audio signals from the filter 138 based on the look direction, and output the desired audio signal, which is a recovered version of the speech 204. At block 1322, the processors 126 may, by utilizing the speakers 134, play the desired audio signal as the reproduced speech 1202 associated with the speech 204 in the cab 112 for the operator 114. In some examples, the reproduced speech 1202 may be generated by the speakers 134 in a way to indicate for the operator 114 the direction of the spotter 202, or the speech 204, relative to the operator 114.

INDUSTRIAL APPLICABILITY

The example systems and methods of the present disclosure are applicable for receiving verbal instructions from a spotter outside of a cab of a machine in a high noise work environment by an operator in the cab of the machine. A variety of large machines, such as, for example, marine vehicles, a truck, an agricultural vehicle, a paving machine, a mining machine, and/or construction vehicles, may be used to excavate, move, shape, contour, and/or remove material present at the worksite, such as gravel, concrete, asphalt, soil, and/or other materials. Many machine tasks require the operator to hear instructions from someone nearby, such as a spotter or others outside the machine. To enable the operator to hear the instructions from the spotter in the high noise environment such as the work site without a radio, such as a walkie-talkie, a plurality of error microphones is disposed in a predetermined pattern on the exterior of the cab, or the machine, to capture audio signals including the instructions (speech) from the spotter. A processor of the system may then remove a primary noise, such as the engine noise, from the captured audio signals, generate a plurality of partially processed audio signals, and generate signal pairs by pairing the plurality of partially processed audio signals. For each signal pair, the processor may generate a respective rotated angular domain cross-correlation vector based, at least in part on, a physical angle associated with locations of a pair of error microphones associated with the signal pair, and sum the rotated angular domain cross-correlation vectors. The processor may then apply a weighting vector, which is designed to suppress a portion of the summed angular domain cross-correlation vector in a direction of the noise source, to the summed angular domain cross-correlation vector, and identify directional information of a desired audio signal associated with the speech from the weighted angular domain vector. The processor may beamform the plurality of partially processed audio signals based on the direction information and output the desired audio signal, which may be reproduced in the cab for the operator.

While aspects of the present disclosure have been particularly shown and described with reference to the examples above, it will be understood by those skilled in the art that various additional embodiments may be contemplated by the modification of the disclosed devices, systems, and methods without departing from the spirit and scope of what is disclosed. Such embodiments should be understood to fall within the scope of the present disclosure as determined based upon the claims and any equivalents thereof.

What is claimed is:

1. A system, comprising:
   a plurality of error microphones disposed in a predetermined pattern, each error microphone of the plurality of error microphones operational to:
   capture a respective audio signal including a speech, and
   generate a respective captured audio signal;
   one or more reference sensors operational to capture a reference noise signal from a noise source;
   a processor communicatively coupled to the plurality of error microphones and the one or more reference sensors; and
   memory communicatively coupled to the processor, the memory storing computer-executable instructions that, when executed by the processor, cause the processor to perform operations, comprising:
   generating a plurality of partially processed audio signals by removing at least a portion of the reference noise signal from each captured audio signal;
   generating a plurality of signal pairs by pairing partially processed audio signals;
   for each signal pair of the plurality of signal pairs, generating a respective rotated angular domain cross-correlation vector based, at least in part, on a physical angle associated with locations of a pair of error microphones associated with the signal pair;
   generating a summed angular domain cross-correlation vector by summing the rotated angular domain cross-correlation vectors;
   generating a weighted angular domain vector by applying a weighting vector to the summed angular domain cross-correlation vector; and
   identifying directional information of a desired audio signal associated with the speech from the weighted angular domain vector.

2. The system of claim 1, wherein the operations further comprise:
   beamforming the plurality of partially processed audio signals based on the directional information and outputting the desired audio signal associated with the speech.

3. The system of claim 2, further comprising:
   one or more speakers disposed inside of a cab of a machine, wherein:
   the plurality of error microphones is disposed in the predetermined pattern on exterior of the cab, and
   the operations further comprise reproducing the desired audio signal associated with the speech via the one or more speakers.

4. The system of claim 3, wherein reproducing the desired audio signal associated with the speech via the one or more speakers comprises reproducing the desired audio signal indicative of a direction of the speech based on the direction information.

5. The system of claim 1, wherein removing at least a portion of the reference noise signal from each captured audio signal comprises filtering each captured audio signal using a least mean square (LMS) filter to remove at least a portion of the reference noise signal.

6. The system of claim 1, wherein, for each signal pair of the plurality of signal pairs, generating a respective rotated angular domain cross-correlation vector comprises
   generating a cross-correlation vector between audio signals of the audio signal pair, and
   converting the cross-correlation vector in a sample domain to a rotated angular domain cross-correlation vector in an angular domain.

7. The system of claim 6, wherein generating the cross-correlation vector between the audio signals of the audio signal pair comprises:
   modifying the cross-correlation vector by removing effects of low frequency contents from the cross-correlation vector.

8. The system of claim 1, wherein the weighting vector is designed to suppress a portion of the summed angular domain cross-correlation vector in a direction of the noise source.

9. A method, comprising:
   capturing a respective audio signal including a speech by each error microphone of a plurality of error microphones disposed in a predetermined pattern;
   capturing a reference noise signal from a noise source by one or more reference sensors;
   generating a plurality of partially processed audio signals by removing at least a portion of the reference noise signal from each captured audio signal;
   generating a plurality of signal pairs by pairing partially processed audio signals;
   for each signal pair of the plurality of signal pairs, generating a respective rotated angular domain cross-correlation vector based, at least in part, on a physical angle associated with locations of a pair of error microphones associated with the signal pair;
   generating a summed angular domain cross-correlation vector by summing the rotated angular domain cross-correlation vectors;
   generating a weighted angular domain vector by applying a weighting vector to the summed angular domain cross-correlation vector; and
   identifying directional information of a desired audio signal associated with the speech from the weighted angular domain vector.

10. The method of claim 9, further comprising:
    beamforming the plurality of partially processed audio signals based on the directional information and outputting the desired audio signal.

11. The method of claim 10, further comprising:
    reproducing the desired audio signal associated with the speech via one or more speakers,
    wherein:
    the one or more speakers are disposed inside of a cab of a machine, and
    the plurality of error microphones is disposed in the predetermined pattern on exterior of the cab.

12. The method of claim 11, wherein reproducing the desired audio signal associated with the speech via the one or more speakers comprises reproducing the desired audio signal indicative of a direction of the speech based on the direction information.

13. The method of claim 9, wherein removing at least a portion of the reference noise signal from each captured audio signal comprises filtering each captured audio signal using a least mean square (LMS) filter to remove at least a portion of the reference noise signal.

14. The method of claim 9, wherein, for each signal pair of the plurality of signal pairs, generating a respective rotated angular domain cross-correlation vector comprises
    generating a cross-correlation vector between audio signals of the audio signal pair, and
    converting the cross-correlation vector in a sample domain to a rotated angular domain cross-correlation vector in an angular domain.

15. The method of claim 14, wherein generating the cross-correlation vector between the audio signals of the audio signal pair comprises
    modifying the cross-correlation vector by removing effects of low frequency contents from the cross-correlation vector.

16. The method of claim 9, wherein the weighting vector is designed to suppress a portion of the summed angular domain cross-correlation vector in a direction of the noise source.

17. A machine, comprising:
    a frame supporting an engine;
    a cab supported by the frame and including an operator compartment, the operator compartment including one or more speakers configured to emit sound;
    a work tool supported by the frame;
    a plurality of error microphones disposed in a predetermined pattern on exterior of the machine, each error microphone of the plurality of error microphones operational to:
    capture a respective audio signal including a speech, and
    generate a respective captured audio signal;
    one or more reference sensors operational to capture a reference noise signal from the engine;
    a processor operably connected to the plurality of error microphones and the one or more reference sensors; and
    memory communicatively coupled to the processor, the memory storing computer-executable instructions that, when executed by the processor, cause the processor to perform operations, comprising:
    generating a plurality of partially processed audio signals by removing at least a portion of the reference noise signal from each captured audio signal;
    generating a plurality of signal pairs by pairing partially processed audio signals;
    for each signal pair of the plurality of signal pairs, generating a respective rotated angular domain cross-correlation vector based, at least in part, on a physical angle associated with locations of a pair of error microphones associated with the signal pair;
    generating a summed angular domain cross-correlation vector by summing the rotated angular domain cross-correlation vectors;
    generating a weighted angular domain vector by applying a weighting vector to the summed angular domain cross-correlation vector;
    identifying directional information of a desired audio signal associated with the speech from the weighted angular domain vector;
    beamforming the plurality of partially processed audio signals based on the directional information and outputting the desired audio signal associated with the speech; and
    reproducing the desired audio signal associated with the speech via the one or more speakers.

18. The machine of claim 17, wherein removing at least a portion of the reference noise signal from each captured audio signal comprises filtering each captured audio signal using a least mean square (LMS) filter to remove at least a portion of the reference noise signal.

19. The machine of claim 17, wherein for each signal pair of the plurality of signal pairs, generating a respective rotated angular domain cross-correlation vector comprises
    generating a cross-correlation vector between audio signals of the audio signal pair, modifying the cross-correlation vector by removing effects of low frequency contents from the cross-correlation vector, and converting the modified cross-correlation vector in a sample domain to a rotated angular domain cross-correlation vector in an angular domain.

20. The machine of claim 17, wherein the weighting vector is designed to suppress a portion of the summed angular domain cross-correlation vector in a direction of the engine.

* * * * *